United States Patent [19]

Suzuki

[11] 4,256,310
[45] Mar. 17, 1981

[54] LEAD-IN SYSTEM FOR RECORD PLAYER

[75] Inventor: Nobuo Suzuki, Yokohama, Japan

[73] Assignee: Katoh Electric Machinery Co., Ltd., Yokohama, Japan

[21] Appl. No.: 56,053

[22] Filed: Jul. 9, 1979

[51] Int. Cl.³ ............................................. G11B 17/06
[52] U.S. Cl. ................................................... 369/217
[58] Field of Search ..................... 274/13 R, 14, 15 R

[56] References Cited

U.S. PATENT DOCUMENTS

| | | | |
|---|---|---|---|
| 2,263,979 | 11/1941 | Bruno | 274/13 R |
| 2,961,242 | 11/1960 | Zimmermann et al. | 274/14 |
| 2,983,514 | 5/1961 | Thevenaz | 274/15 R |
| 3,385,603 | 5/1968 | Knopfle | 274/15 R |
| 3,822,889 | 7/1974 | Nakagawa | 274/10 R |
| 3,847,401 | 11/1974 | Evans | 274/10 R |

FOREIGN PATENT DOCUMENTS

| | | | |
|---|---|---|---|
| 2344109 | 3/1975 | Fed. Rep. of Germany | 274/15 R |
| 87676 | 2/1958 | Netherlands | 274/15 R |

*Primary Examiner*—John W. Shepperd
*Attorney, Agent, or Firm*—George B. Oujevolk

[57] ABSTRACT

A lead-in system for record players. The tone arm is mechanically moved towards a record on the record player turntable by a mechanical actuating means having a tone arm lifter. The tone arm is stopped at a position above the record lead-in groove by tone arm sensing means. Operating means are provided which can simultaneously or individually operate the tone arm lifter, the actuating means and the tone arm sensing means. The swing of the operating member of the actuating means is controlled through a positioning plate which in turn is controlled in its swing range by a selector lever of the tone arm sensing means. The operation of the operating member is thus controlled.

4 Claims, 10 Drawing Figures

LEAD-IN SYSTEM FOR RECORD PLAYER

BACKGROUND OF THE INVENTION

This invention relates to a tone arm lead-in system adapted for use in record players.

BRIEF DESCRIPTION OF THE PRIOR ART

The following two types of systems are known for automatically leading the tone arm into the lead-in groove of a record which is variable in size: one system comprises electrical means using a drive motor as the exclusive driving source and the other system comprises mechanical means employing mechanical actuating means of an oil damper structure that was developed by the present inventor. The former has the problem of increased manufacturing cost as the driving motor is expensive and will and thus bots the cost of the apparatus as a whole. The latter has an advantage of cheaper manufacturing cost. Giving an eye to such advantage, this inventor has previously proposed a record player device including a lead-in system comprising such mechanical means in his pending patent application (Japanese Patent Application No. Showa 52-119275).

This system comprises essentially an elevation plate which vertically lifts the elevation arm of the tone arm lifter and includes a blade-attached shaft which enables the tone arm to turn automatically toward the turntable, and is housed in a rotary receptacle containing a viscous fluid. It is also provided with a tone arm operating lever so arranged that the rotation of the shaft can be controlled by pushing a bar, as well as a tone arm sensing means consisting of a positioning plate adapted to control the range of swing of the tone arm toward the record and a selector lever designed to control the range of swing of said operating lever only when a record with the diameter of 30 cm is used. A cam is arranged to contact the arm lifter elevation plate. The pushing bar of the actuaing means, and the tone arm sensing means, and an operation lever secured to said cam are operated by the operation lever, when the end of the tone arm is raised up to its elevated position through the arm lifter, while both actuating means and tone arm sensing means are brought into an inoperative condition relative to the tone arm when the end of said tone arm is moved down to its lowered position.

This lead-in system is provided with all the basic functions required for guiding the tone arm into the lead-in groove of any size record by remote control by mechanical means. However, there were yet defects concerning the capacity of the actuating means, tone arm sensing means, and their controlling function which could create problems when carried out into practice commercially.

OBJECTS OF THE INVENTION

An object of this invention, therefore, is to provide an improved lead-in system for record players which is free of said defects of the prior art and capable of providing a more stabilized operation.

Other objects and features of this invention will become more apparent as this invention is more fully described hereinafter with reference to the accompanying drawings, in which:

DETAILED DESCRIPTION

Figure 1:
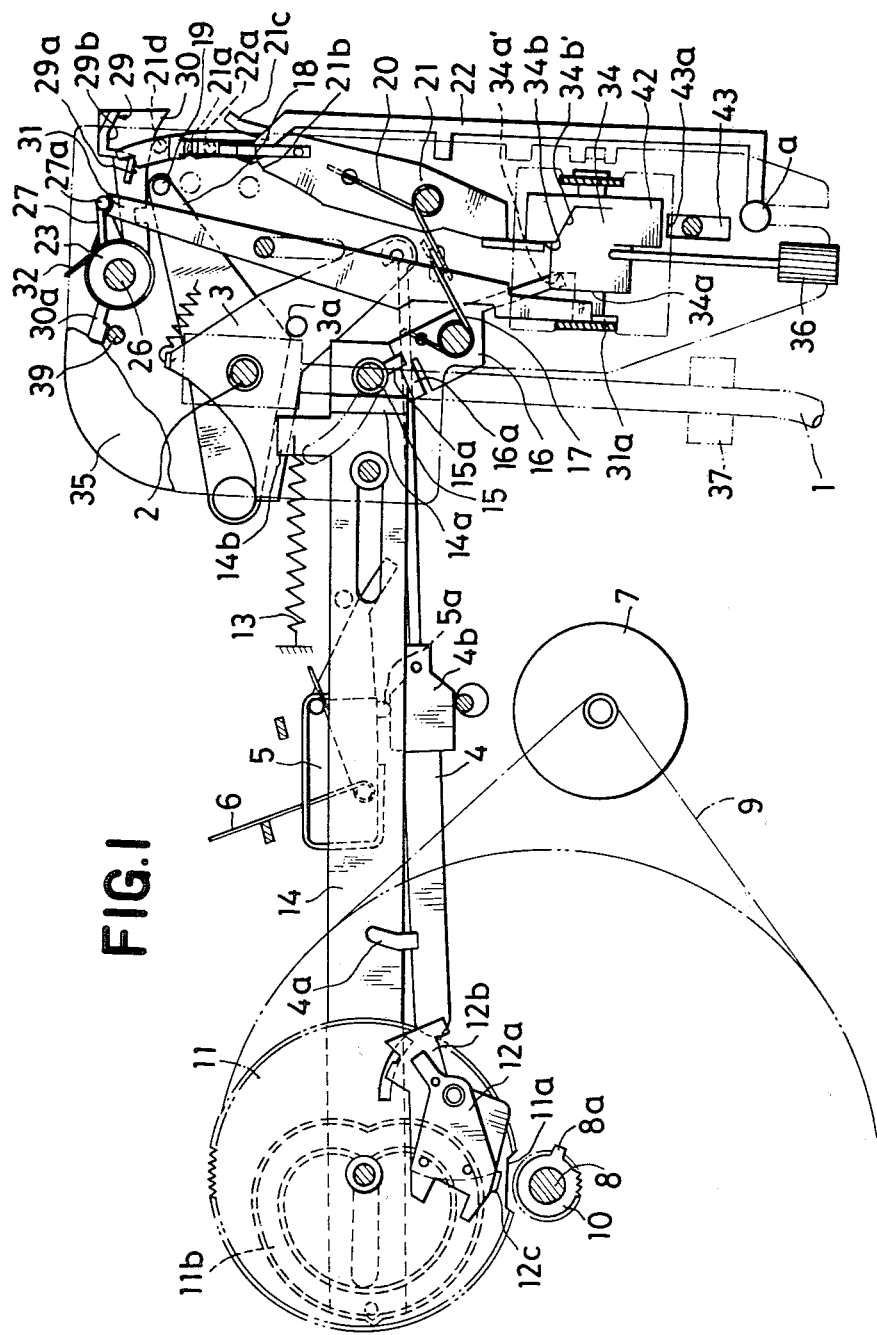
FIG. 1 is a schematic plan view for illustrating the positional relation between the lead-in system according to this invention and other associated record playing elements, with the operation lever being turned down toward the operator.

The invention is now described in detail by way of an embodiment thereof while having reference to the drawings.

In the drawings, numeral 1 denotes a tone arm, 2 a tone arm shaft 3, the operation plate fixed to said tone arm shaft 2, and 4 a slide lever pivotally connected to said operation plate 3. Slide lever 4 is provided with a projection 4a at a left side end thereof, and a switch control piece 4b is pivotally mounted on an intermediate portion of said slide lever 4. 5 is a microswitch arranged to be opened and closed by said switch control piece 4b, said microswitch 5 being normally disposed to turn counterclockwise by a torsion coil spring 6. 7 is a drive motor which is driven as said microswitch 5 is turned ON, 8 is a turntable shaft rotated by said drive motor 7 through a belt 9, 10 is a pinion arranged to turn with said turntable shaft 8, and 11 is a gear meshed with said pinion 10. The pinion 10 is normally placed in a notch portion 11a formed at a peripheral part of the gear 11 so that said pinion is idly rotated in the notch portion 11a. It will be seen that link claws 12a and 12b are pivoted overlapping to each other on the upper surface of the gear 11, while a heart-shaped cam groove 11b is provided in the under surface of the gear 11. 14 is a return plate supported so as to be movable longitudinally thereof while biased to the left by a spring 13, said return plate 14 having at its left side end a pin engaged with said cam groove 11b.

The elevation means comprises an elevation arm 15 provided with a conventional oil damper structure, said arm 15 being positioned above and near by a bent portion 14a provided at the right side end of said return plate 14, and a elevation plate 16 having a slanted piece 16a and pivotally mounted on the undersurface of the base plate 35, said elevation plate 16 being normally biased to rotate in a counter clockwise direction by torsion coil spring 17, said slanted piece 16a being abutted against said rotation preventing member 15a provided with said elevation arm 15.

The means comprises an oil cup 23 fixed to the base plate 35, a fixed plate 24 arranged for closing the underside opening of oil cup 23, a rotary disc 25 disposed in a space formed between fixed plate 24 and oil cup 23, a shaft 26 extending downwardly from rotary disc 25 through a fixed plate 24, a rotary cylinder 27 fitted on shaft 26, rotary cylinder 27 having provided radially on its outer periphery a pressure-bearing pin 27a, an operating member 30 rotatably mounted on rotary cylinder 27 through a friction member 28 such as expanded neoprene foam and having a zigzag stopper wall 29 at the upper surface of the the right side thereof, a pushing lever 31 arranged to be longitudinally slidable and having a bent end portion abutting against the pressure-bearing pin 27a, and a stopper pin 39 extending downwardly from the base plate 35 within the range of movement of the left side end of the operating member 30. The rotary cylinder 27 is urged to turn clockwise by a torsion coil spring 32 wound around said cylinder 27, while the operating member 30 is pressed against the friction member 28 by a compressed coil spring 33 interposed between operating member 30 and an end of rotary cylinder 27. The space between said rotary disc 25 and fixed plate 24 is filled with a highly viscous fluid 38 such as silicon oil contained in the oil cup 23.

Said actuating means may be provided with damping by rotating a shaft with a blade-attached in a hollow rotary cylinder containing a viscous oil, but according to the of the instant invention, a greater damping force is provided with a more simple structure and the tone arm 1 designed to be swingable sidewise with application of a very light pressure can be smoothly swung to the lead-in groove of a record of any size. Thus, since the tone arm 1 can be swung very easily, there is no likelihood that it should be brought too far toward the record.

The tone arm sensing means comprises a positioning plate 21 located outside the locus of movement of a sensing pin 19 secured at the end of a sensing plate 18 pivotally mounted on the tone arm shaft 2 so as to be rotatable with the operation plate 3, said positioning plate 21 being pivotally secured while urged to turn counterclockwise by a torsion coil spring 20, and a selector lever 22 designed to be longitudinally slidable and provided with a projection 22a arranged to contact a stopper 21c of said positioning plate 21 when the operaor pulls the positioning plate 21 on his side. On the left side contacted with the sensing pin 19, said positioning plate 21 is provided with a first concave portion 21a into which said sensing pin 19 clicks to stop the tone arm 1 on the lead-in groove of a 30 cm diameter record. A second concave portion 21b is designed for stopping said tone arm 1 on the lead-in groove of a 17 cm record, and a downwardly extending stopper pin 21d directed toward the stopper wall 29 provided in the operating member 30 of the actuating means.

In another embodiment of the tone arm sensing means the selector lever 22 may omit if the first concave portion 21a in the positioning plate 21 is so formed as to inhibit ride-over of the sensing pin 19. Also, a protuberance may be provided on the selector lever 22 to control the span of swinging movement of the operating member 30, but according to the arrangement of the present application, there is eliminated any risk of obstructing movement of other members such as sensing pin 19 and positioning plate 21.

The operation means comprises a cam 34 pivotally mounted on the base plate 35 and having two axially arranged cam walls 34a, 34b, a working protuberant member 41 extending downwardly from a left side end of said cam 34 and provided with an arcuate groove 40 having a hooked portion 40a at its downside end, and an operation lever 36 fixed to the cam 34 and extending upwardly from the base plate 35, said operation lever 36 being movable toward or away from the operator. Fitted in said arcuate groove 40 is an engaging pin 31b attached on a projecting 31a pending down from a front end of the pushing lever 31. The front end of the elevation plate 16 of the elevation means contacts the cam wall 34a of the first stage, while a front end of the positioning plate 21 of the tone arm sensing means contacts with the cam wall 34b of the second stage. On one side radially of the cam 34, there are provided a rotation controlling means consisting of a protrusion 42 protruding from the cam 34 and provided with a recession 42a and a leaf spring 43 extending downwardly from the base plate 35 and arranged to contact said protrusion 42, and rotation biasing means consisting of a protuberance 44 extending downwardly from the cam 34 and a tension coil spring 45 interposed between said protuberance 44 and the base plate 35.

The operation means can perform its function even if the swinging controlling means or actuating means of cam 34 are not provided, but provision of these means can stabilize the cam 34 and hence the operation lever 36 in the neutral position, and when said operation lever 36 is turned to either side, it turns surely to the set position, thus lessening the chance of misoperation and improving the operational reliability.

Figure 2:
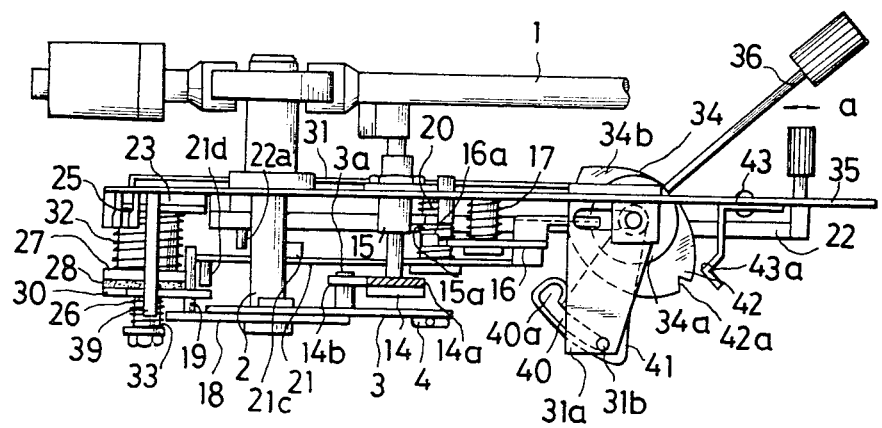
FIG. 2 is a left-hand side view of the lead-in system shown in FIG. 1.
Figure 3:
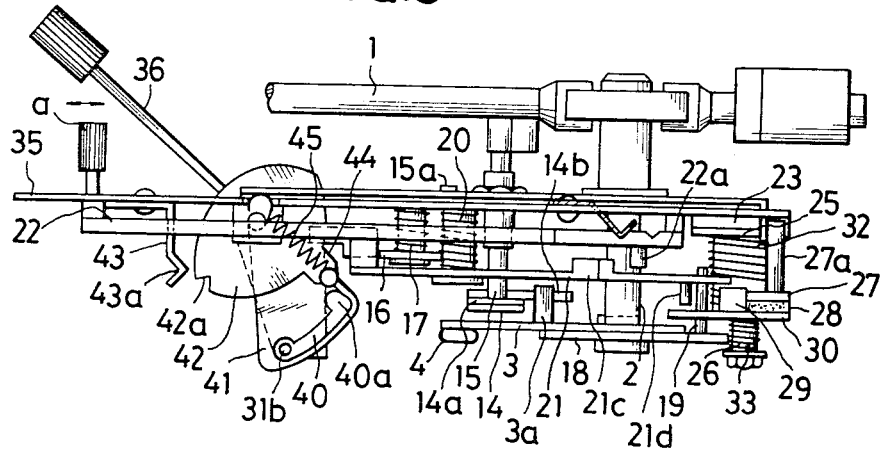
FIG. 3 is a right-hand side view thereof.

In the condition before starting record playing, with the tone arm 1 resting on the arm rest 37, the operation lever 36 stays at operator's side position as shown in FIGS. 1 to 3, under this condition, the elevation arm 15 of the elevation means is kept at its lowered position as a front end of the elevation plate 16 is in contact with a flat portion to which is descended along the slope 34a' of the cam wall 34a of the first stage while the rotation preventing member 15a is in abutment against the bottom of the slanted piece 16a provided at the rear end of said elevation plate 16. On the other hand, a front end of the positioning plate 21 of the tone arm sensing means is in contact with the upper flat portion where it ascends along the slope 34b' of the second cam wall 34b, that is, it stays away from the sensing pin 19, while the operating member 30 of the actuating means is also kept away from the sensing pin 19 as it is pushed by the pushing lever 31 through the pressure-bearing pin 27a. Thus, both said positioning plate 21 and said operating member 30 remain inoperative relative to the sensing pin 19. The pushing lever 31 is biased to its position on the operator's side by the biasing force of the torsion coil spring 32 and the engaging pin 31b is at the terminal end of the arcuate groove 40, but since the position of engagement of the pin 31b with the arcuate groove 40 is located forwards of the pivotted point of the cam 34, the horizontal returning force is well checked by said arcuate groove 40 to maintain the stationary condition.

Figure 4:
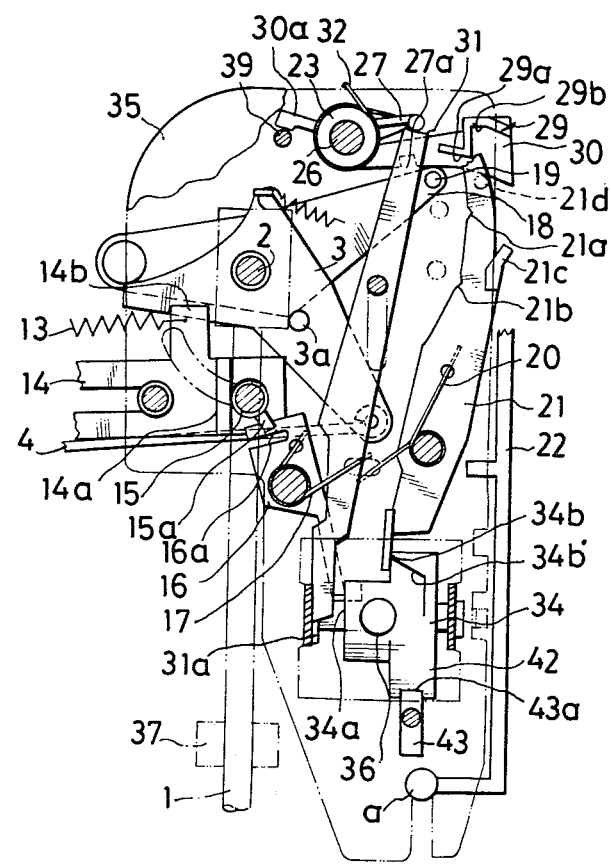
FIG. 4 is a view similar to FIG. 1 but showing the operation lever as it was brought to its neutral position.
Figure 5:
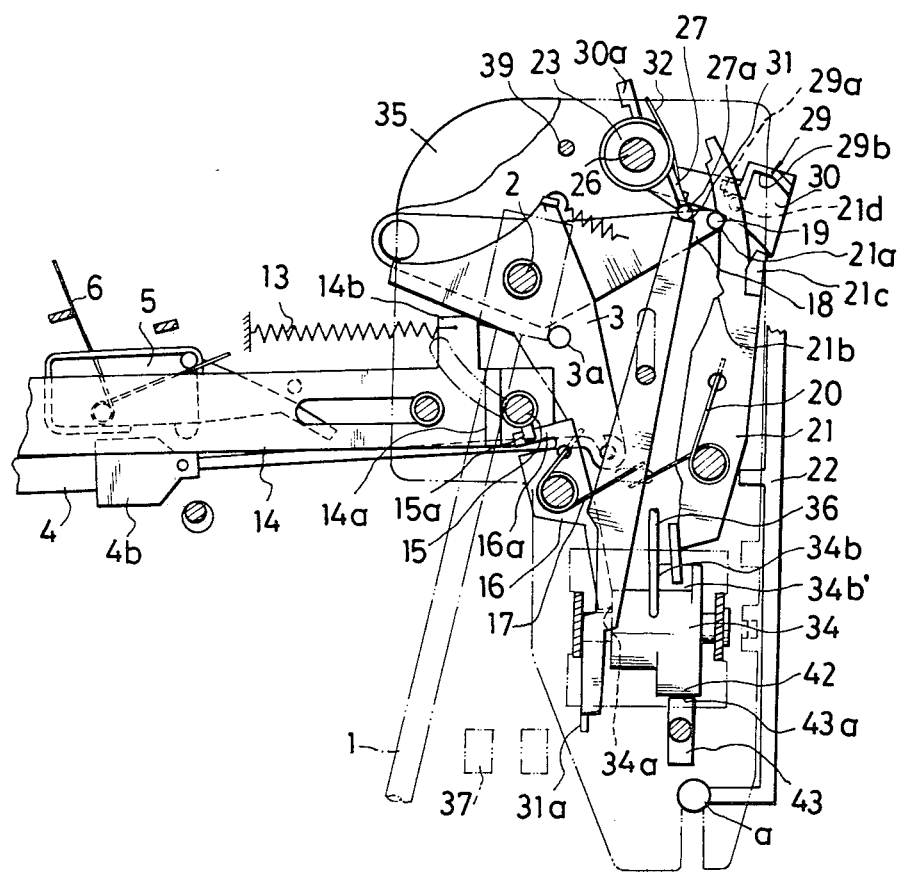
FIG. 5 is a plan view but showing the operation lever as it was swung to the side opposite from the operator.

When it is desired to play a 30 cm diameter record placed on the turntable, first the operator makes sure that the selector lever 22 is at its predetermined position a and then he raises up the operation lever 36 to its vertical position shown in FIG. 4, so that the cam 34 is urged to swing while encountering a slight resistance by the tension coil spring 45 and a slight resistance is produced when the leaf spring 43 slides away on the protrusion 42, and the elevation plate 16 of the elevation means swings as it reaches the upper flat portion by climbing the slope 34a' on the cam wall 34a with which the front end of said elevation plate 16 contacts, so that the rotation preventing member 15a contacting the bottom of the slanted piece 16a at the rear end of said elevation plate 16 is forced to move up to the top of said slanted piece 16a to lift up the elevation arm 15, thereby slightly raising up the front end of the tone arm 1. The end of the positioning plate 21 also slides along the cam wall 34b of the second stage, but it gives no influence to the cam since, at this position, the cam wall 34b is still at the flat portion. During this operation, the pushing lever 31 of the actuating means causes no obstruction to swinging of the cam 34 as the engaging pin 31b slides in the arcuate groove 40 in the working protuberance member 41, but since its engaged position is located forwards of the pivotted point of the cam 34, any effort to move pushing lever 31 horizontally toward the operator's side by the biasing force of the torsion coil spring 32 is prevented by the arcuate groove 40, allowing the rotary cylinder 27 to stay still to maintain a stand-by condition. Since the protuberant portion 43a of the leaf spring 43 fits into the recession 42a under this condition, the stationary condition of the cam 34 itself is also stabilized.

Thus, in the instant embodiment, the sensing pin 19 is in a free condition in this stage and it is possible to move the tone arm 1 manually onto the lead-in groove of a record.

The actuating means still stays inoperative in the condition where the operation lever 36 is kept at its vertical position, so that, under this condition, if the operator swings the tone arm 1 manually to its position above the record and then pulls the operation lever 36 toward him, the cam 34 is forced to turn automatically by the traction of the tension coil spring 45 after encountering a resistance that is produced when the protuberant portion 43a of the leaf spring 43 slips out of the recession 42a in the raised portion 42, and the front end of the elevation plate 16 of the elevation means swings in a counterclockwise along the slope 34b' of the cam wall 34b, so that the rotation preventing member 15a of the elevation means is moved down to the bottom of the slanted piece 16a for lowering down the tone arm 1. In this case, as described aboe, the pushing lever 31 is not moved in any direction. Therefore, this arrangement is suited for effecting lead-in, with no fear of dropping the needle onto the record by mischance, when it is desired to start playing from a halfway point on the record or when using a record of a size not cited in the described embodiment of this invention.

When the operation lever 36 is turned to the opposite side of operator from the vertical position, the cam 34 initially encounters a slight amount of resistance as the protuberant portion 43a of the leaf spring 43 is released from the recession 42a in the protrusion 42, but thereafter the cam 34 turns automatically under the traction of the tension coil spring 45. The elevation plate 16 of the elevation means remains uninfluenced as the front end thereof stays in contact with the upper flat portion of the cam wall 34, but the positioning plate 21 of the tone arm sensing means and the pushing lever 31 of the actuating means are influenced simultaneously, that is, the positioning plate 21 is turned counterclockwise to come into contact with the sensing pin 19 as a front end of said positioning plate 21 descends along the slope 34b' on the cam wall 34b of the second stage, furthermore, the pushing lever 31 is pulled toward the operator's side while forcing the engaging pin 31b on the projection 31a to drop into the hooked portion 40a of the arcuate groove 40 in the working protuberant member 41. Accordingly, the pressure-bearing pin 27a released from the pushing action of said pushing lever 31 is urged to turn together with the operating member 30 by the damper action produced from the synergistic and counter effect of the viscous fluid 38 filling the space between the rotary disc 25 and fixed plate 24 and the biasing force of the torsion coil spring 32, and said operating member 30 pushes the sensing pin 19. Thus, the tone arm 1 is pushed in a clockwise direction by said operating member 30 through the sensing plate 18. When the sensing pin 19 has dropped into the first concave portion 21a in the positioning plate 21, the stopper 21d, extending downwardly from the rear end of said positioning plate 21 abuts against the first stepped portion 29a on the stopper wall 29 of the operating member 30, so that no further urging action is given at this position where there exists sufficient extra force for rotating the operating member 30, and the tone arm 1 is automatically moved onto the lead-in groove of the 30 cm diameter record and is stopped stably at this position. By this time, the switch control piece 4b pivotally mounted on the slide lever 4 (which has moved to the left longitudinally with the turning of the operation plate 3) will have been separated from the contact buttom 5a of the microswitch 5 to turn in ON, so that the drive motor 7 is driven to let the turntable start to turn.

When the operator again pulls the operation lever 36 toward him from the opposite side, since the engaging pin 31b planted on the projection 31a of the pushing lever 31 engages with the hooked portion 40a of the arcuate groove 40 in the working protuberant member 41, said pushing lever 31 is slidingly moved to rear wards through said member 41 which turns with the cam 34, and its bent end portion pushes the pressure-bearing pin 27a to let it turn counterclockwise against the force of the torsion coil spring 32, therefore, operating member 30 is turned counterclockwise with the rotary cylinder 27 through the means of the friction member 28. Thus, said operating member 30 parts from the sensing pin 19.

When the operation lever 36 is again brought to its vertical position, as the engaging pin 31b moves out of the hooked portion 40a, the movement of the pushing lever 31 is stopped. Such stationary condition of said pushing lever 31 is maintained stable as long as the operation lever 36 is not again turned to the opposite side, since the pushing lever 31 is prevented from making any horizontal movement by the arcuate groove 40 which inhibits any such horizontal movement. In this vertical position, since the front end of the positioning plate 21 climbs the slope 34b' of the cam wall 34b as shown in FIG. 4, it is forced to turn clockwise opposing the torsion coil spring 30 and parts from the sensing pin 19 to bring the tone arm 1 into a free state. Then, when the operation lever 36 is further turned toward the operator as shown in FIGS. 1 to 3, the front end of the elevation plate 16 of the elevation means goes down along the slope 34a' of the wall 34, so that said plate 16 is forced to turn counterclockwise by means of the torsion coil spring 17 and accordingly the rotation preventing member 15a, which has been positioned at the top of the slanted piece 16a, descends along with the elevation arm 15 to lower down the tone arm 1 quietly onto the lead-in groove of the record. Since the front end of the positioning plate 21 stays in contact with the upper flat portion of the cam wall 34b, the rear side end portion of said positioning plate 21 remains uncontacted with the sensing pin 19. Since the engaging pin 31b of the pushing lever 31 slides in the arcuate groove 40, and any horizontal movement of the pushing lever 31a is checked by the arcuate groove 40, the operating member 30 maintains a stand-by condition for turn of the rotary cylinder 27.

If after the tone arm 1 has been moved to the record, it is desired, for some reason or other, to again return the tone arm 1 onto the arm rest 37 before the tone arm is lowered down into the lead-in groove, in order to meet such situation, the operating member 30 of the actuating means is, pivotally secured so as to be able to turn frictionally relative to the rotary cylinder 27. According to this arrangement, said operating member 30, as pushed by the sensing pin 19, turns and recedes by giving a frictional resistance while the positioning plate 21 swings clockwise against the force of the torsion coil spring 20, thus allowing easy return of the tone arm 1 onto the arm rest 37 by a manual operation. In this case, however, it is necessary for again effecting automatic lead-in to turn the operation lever 36 once toward the operator's side and then again repeat the operation. For, by so doing, the positioning plate 21 is turned clockwise by the action of the cam wall 34b and parts from the sensing pin 19, while the rotary cylinder 27 of the actuating means is pushed by the pushing lever 31 and is returned to the original position. In this case, since the operating member 30 does not recede more than a certain given distance owing to the stopper pin 39, there is no fear that the sufficient delivery of the tone arm 1 might not be made when another automatic lead-in is performed.

Figure 7:
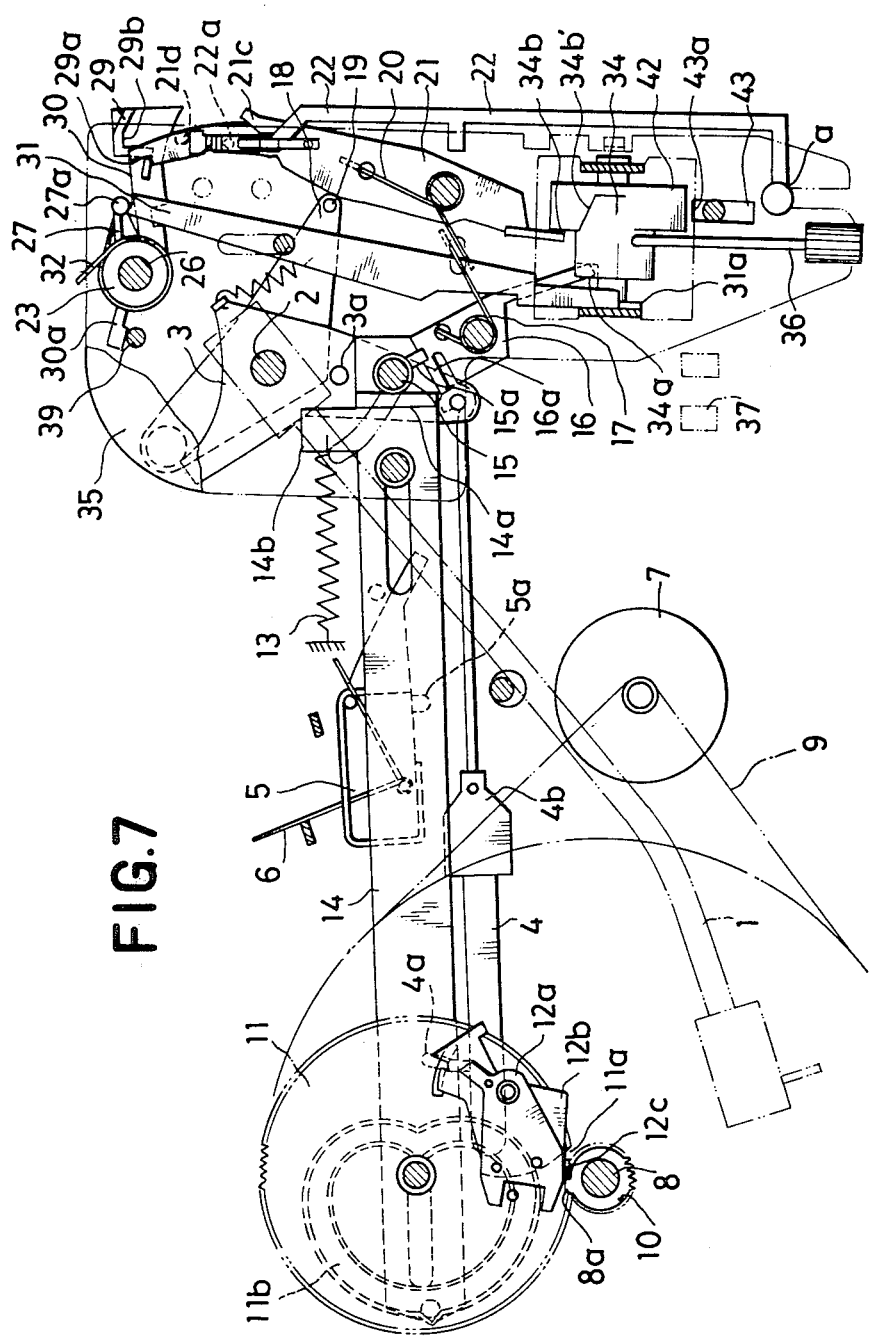
FIG. 7 is a schematic plan view of a record player including the lead-in system of this invention, said player being shown in a condition where the record playing has just ended.
Figure 8:
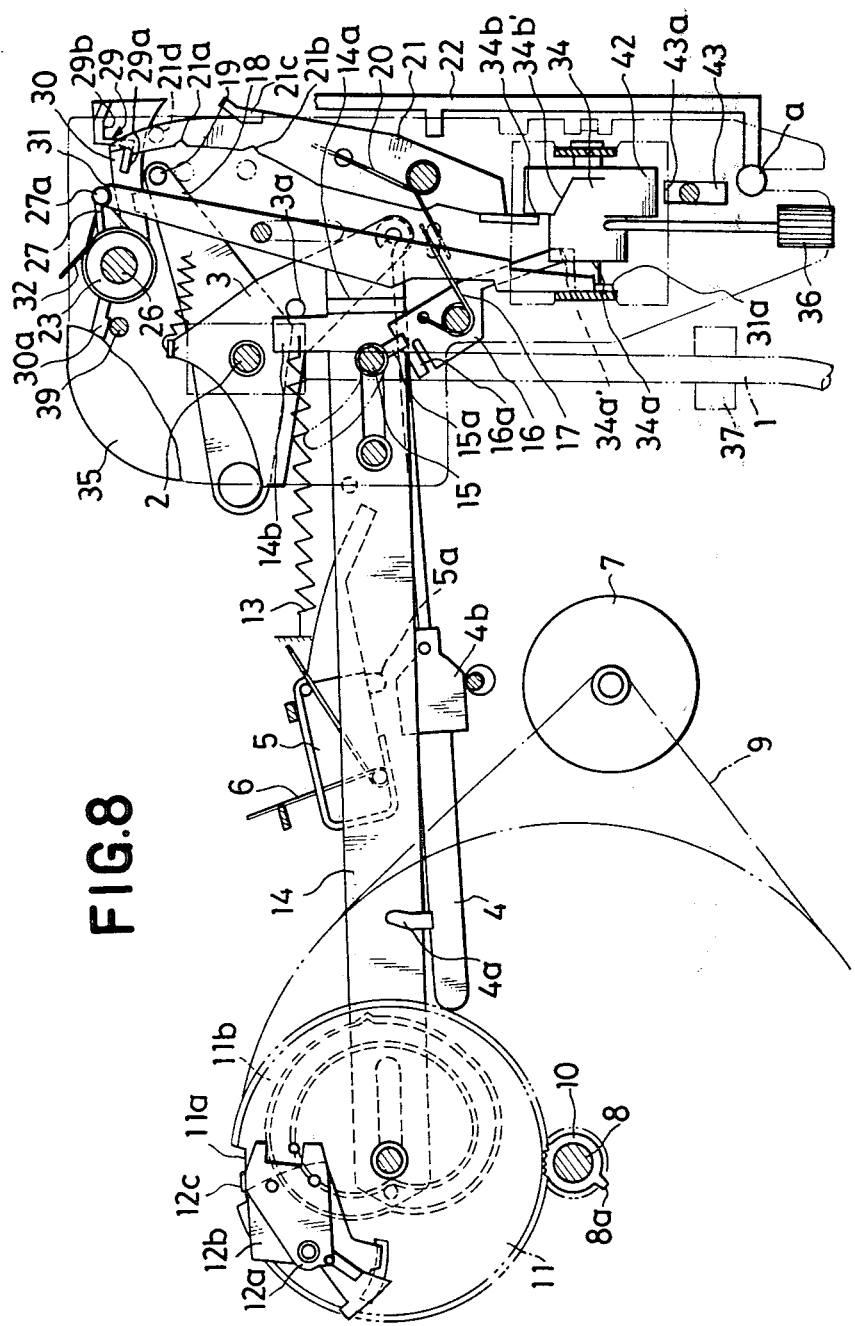
FIG. 8 is a view similar to FIG. 7 but showing a condition where the tone arm has been just returned to its position on an arm rest by an automatic-return mechanism.
Figure 9:
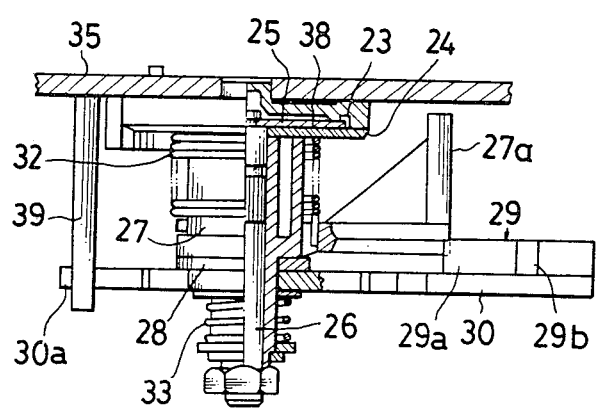
FIG. 9(a) is a partial sectional side view of the actuating means.
FIG. 9(b) is a bottom view thereof.
Figure 9:
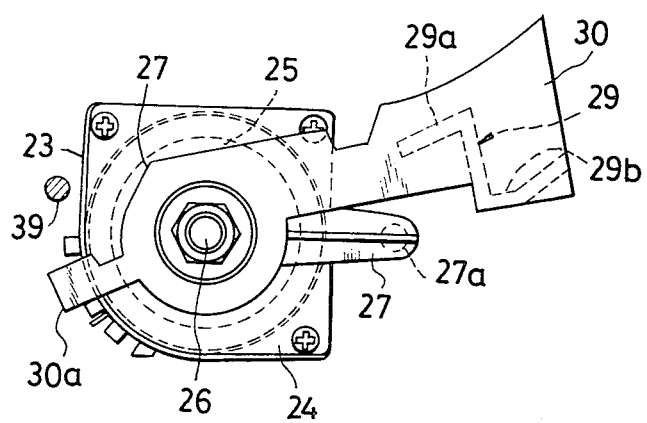

It is possible in this way to start playing the record, and when the tone arm 1 moves into the lead-out groove at the end of the record playing, the pitch of the leftwise movement of the slide lever 4 is enlarged as shown in FIG. 7 and its projection 4a pushes the link claw 12b, so that the link claw 12a simultaneously rotates in a counterclockwise, the protuberance 12c of said link claw 12a is engaged with the corresponding protuberance 8a on the turntable shaft 8, causing the gear 11 to turn slightly counterclockwise, whereby the pinion 10 is released out of the notch portion 11a of the gear 11 and meshed with said gear 11 to let said gear start rotating. Accordingly, the return lever 14 engaged in the heart-shaped cam groove 11b provided in the underside of the gear 11 starts to move to the right against the force of the tension coil spring 13 as shown in FIG. 8, and the elevation arm 15 is raised up by the bent portion 14a of said return lever 14 and then its projection 14b pushes the operation pin 3a erected on the operation plate 3, whereby the tone arm 1 is slightly raised up at its front end and returned onto the arm rest 37, and this is followed by movement to the left of the return lever 14 to its original position, so that the elevation arm 15 is released from the lifting action by the bent portion 14a and allowed to move downwardly. Thus, the tone arm 1 is placed on the arm rest 37 and the switch control piece 4b of the slide lever 4 which moved to the right pushes the contact button 5a of the microswitch 5 to turn it OFF.

Figure 6:
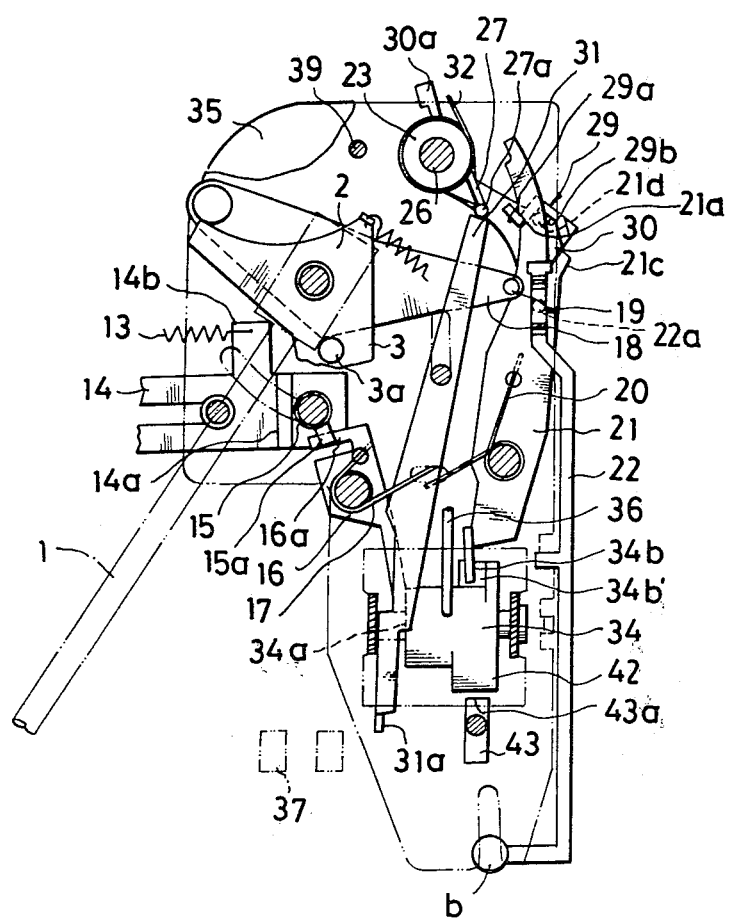
FIG. 6 is another similar plan view in which the selector lever and the operation lever was swung to the side opposite from that of the operator.

When it is desired to play a 17 cm diameter record, the selector lever 22 is first moved to the position b as shown in FIG. 6 and then the operation lever 36 is operated in the same wasy as in the case of a 30 cm record described above, whereby when the positioning plate 21 swings, the projection 22a of the selector lever 22 abutts against the stopper 21c of said plate 21 and said swing is more restricted than in the case of a 30 cm record, so that the stopper pin 21d does not abutt against the first stepped portion 29a of the cam wall 29 of the operating member 30 but reaches the second stepped portion 29b positioned rearwards. This allows the operating member 30 to move along a greater distance than in the case of a 30 cm record to bring the tone arm 1 to its position above the lead-in groove of the 17 cm record. The succeeding operations and functions are the same as described above.

If the actuating means is constructed as in the above described embodiment, it is possible to obtain an actuating force of a stablized speed by the viscous fluid 38 filling the space between the rotary disc 25 and fixed plate 24, so that even though the operating member 30 is delivered along a greater distance, there is no fear that the tone arm 1 (which is moved easily by a very slight push) should be given extra force to run too far for such small-sized record.

As for the operating member 30 of the actuating means in this embodiment, the operator may be obliged to suffer some inconvenience when it is necessary to return the tone arm 1 to the arm rest 37 manually in the event of a misoperation. In case of providing a means for checking said member together with the rotary cylinder 27, such means may be integral with said cylinder.

As described above, this invention allows, as it were, remote controlled lead-in of the tone arm of a record player to the position above the lead-in groove of the record of any desired size without the need of touching the tone arm, so that there is no possibility that the tone arm be dropped accidentally to damage the record or needle, and one can operate the player with no mistake and enjoy the record playing even in the dark. Further, according to this invention, movement of the tone arm relative to a record of any desired size can be effected more precisely and surely, and it is also possible to remote-control the lifting motion alone of the tone arm independently of the other elements.

What is claimed is:

1. In a lead-in system for a record player having a turntable for playing records of various sizes which records have a lead-in groove, and further including,
    (a) a tone arm (1) with inner and outer ends;
    (b) tone arm elevating means (15) operatively coupled to said tone arm inner end;
    (c) actuating means, including an operating member (30) for moving said tone arm towards a record on the turntable;
    (d) tone arm sensing means (18, 19) including a positioning plate (21) for stopping said tone arm so that the outer end thereof is at a position above the lead-in groove of a record on said turntable;
    (e) operating means (34, 40, 41) including a cam operatively coupled to said tone arm elevating means (15) said actuating means, and said tone arm sensing means, for jointly and severally operating them;
    (f) a selector lever (22) with selector means coupled to said positioning plate (21);
    (g) stopper portions (29a, 29b) disposed at different positions of said operating member (30); and,
    (h) protuberance means disposed on said positioning plate (21) to regulate the stop positions of said tone arm, said protuberance means being arranged to abutt against one of said stopper portions according to the position of said positioning plate selected by said selector lever (22), so as to control said actuating means and said operating member;

the improvement in said lead-in system comprising:

(i) having a rotary cylinder (27) as part of said actuating means, said rotary cylinder (27) supporting said operating member (30); a pushing lever (31) for controlling said rotary cylinder (27) having a rear end at said rotary cylinder and a front end at said cam of the operating means, disposed for longitudinal sliding movement, said pushing lever having a projection (31a) extending from said pushing lever front end; a turning protuberant member (41) extending from said cam (34) having an arcuate open path (40) with a hook end, said pushing member projection (31a) extending to said open path (40); engaging means (31b) engaging said projection (31a) to said path (40) so disposed that said pushing lever (31) is operated only when said protuberant member (41) is engaged in the hook end, said engagement being released at a certain turn position of said protuberant member because of the difference in the curve of the arcuate movement of said protuberant member (41) and said arcuate open path (40).

2. A system as claimed in claim 1, including bias means coupled to said rotary cylinder to normally bias said rotary cylinder to turn in one direction, said operating member (30) being swingable and in frictional relation with said rotary cylinder (27) and arranged to press against said tone arm (1); a rotary disc secured to said rotary cylinder and a fixed plate disposed in opposed relation to said rotary disc, with a vascous fluid filling the space between said fixed plate and said rotary disc.

3. A system as claimed in claim 2 wherein said cam (34) is pivotally supported and has cam walls arranged in at least two stages axially; said tone arm elevating means and said tone arm sensing means each having an elevation plate each elevation plate having an end, said respective ends each being brought into abutment against said cam walls.

4. A system as claimed in claim 3 including cam rotation controlling means comprising a concave-convex portion coupled to the cam and a leaf spring engaged with said concave-convex portion.

* * * * *